United States Patent [19]

Weiser et al.

[11] Patent Number: 5,321,834
[45] Date of Patent: Jun. 14, 1994

[54] METHOD AND SYSTEM FOR RECLAIMING UNREFERENCED COMPUTER MEMORY SPACE

[75] Inventors: Mark D. Weiser, Palo Alto; Alan J. Demers, Woodside; Daniel G. Bobrow, Palo Alto; Barry Hayes, Stanford, all of Calif.

[73] Assignee: Xerox Corporation, Stamford, Conn.

[21] Appl. No.: 140,720

[22] Filed: Oct. 21, 1993

Related U.S. Application Data

[63] Continuation of Ser. No. 989,741, Dec. 10, 1992, abandoned, which is a continuation of Ser. No. 442,374, Nov. 28, 1989, abandoned.

[51] Int. Cl.$^5$ .................. G06F 12/00; G06F 12/08
[52] U.S. Cl. ................... 395/600; 395/425; 364/DIG. 1; 364/281.1; 364/282.2
[58] Field of Search .............. 364/DIG. 1, DIG. 2

[56] References Cited

U.S. PATENT DOCUMENTS

| | | | |
|---|---|---|---|
| 4,074,353 | 2/1978 | Woods et al. | 364/200 |
| 4,121,286 | 10/1978 | Venton et al. | 364/200 |
| 4,660,130 | 4/1987 | Bartley et al. | 364/200 |
| 4,758,944 | 7/1988 | Bartley et al. | 364/200 |
| 4,775,932 | 10/1988 | Oxley et al. | 364/200 |
| 4,797,810 | 1/1989 | McEntee et al. | 364/200 |
| 4,807,120 | 2/1989 | Courts | 395/425 |
| 4,814,971 | 3/1989 | Thatte | 364/200 |
| 4,853,842 | 8/1989 | Thatte et al. | 364/200 |
| 4,907,151 | 3/1990 | Bartlett | 364/200 |
| 4,989,132 | 1/1991 | Hellender et al. | 364/200 |
| 4,989,134 | 1/1991 | Shaw | 364/200 |

OTHER PUBLICATIONS

H.-J. Boehm and M. Weiser, "Garbage Collection in an Uncooperative Environment", *Software Practice and Experience*, vol. 18, Issue 9, Sep. 1988 (pp. 807-819).
Adele Goldberg & David Robson, "Garbage Collection", *Smalltalk*-80, Xerox Palo Alto Research Center (pp. 674-684).
Gupta, et al., "Reliable Garbage Collection in Dist. Object Oriented Sys.," 1988, Chicago, IEEE Comp Soc Press, pp. 324-328.
Edwards, et al., "The Symbolics I-Machine Architecture . . . ," 1987, Washington, IEEE Comp Soc Press, pp. 502-505.
Hanson, David, "Storage Management for an Imp. of SNOBOL4, " 1977, Software Practice and Experience, vol. 7, pp. 179-192.

(List continued on next page.)

Primary Examiner—Gareth D. Shaw
Assistant Examiner—Lucien Toplu
Attorney, Agent, or Firm—Townsend and Townsend Khourie and Crew

[57] ABSTRACT

A computer program is disclosed for reclaiming unreferenced computer memory space, also known as garbage collection. The program operates in a virtual memory environment wherein user memory space is divided into pages. For each active page, a table stores the age of the oldest object on the page (A-value) and the age of the youngest object pointed to from that page (F-value). A generational partition divides the pages into "safe" pages and "threatened" pages, based on their A-values. Rescuer pages, which may contain pointers to threatened pages, are determined by comparing the F-values to the generational partition. All potential pointers on the rescuing pages are traced and the objects pointed to are marked as reachable. All objects reachable from other reachable objects are also marked. Unmarked threatened objects are de-allocated.

5 Claims, 7 Drawing Sheets

OTHER PUBLICATIONS

Ellis, et al., "Real-time Concurrent Collection on Stock Multiprocessors," Feb. 14, 1988, DEC's Systems Research Center Publicat'n.

Lieberman, et al., "A Real-Time Garbage Collector Based on the Lifetimes of Objects," Jun. 1983, Research Contrib., vol. 26, No. 6.

Shaw, Robert, "Improving Garbage Collector Performance in Virtual Memory," Mar. 1987, Technical Rpt. by CSL, Stanford Univ.

Moon, David, "Garbage Collection in a Large Lisp System," 1984, Symbolics, Inc., Cambridge, Massachusetts.

Sobalvarro, Patrick, thesis "A Lifetime-based Garbage Collector for LISP Systems on General Purpose Computers," Sep. 1988, M.I.T.

Bartlett, Joel, "Compacting Garbage Collection with Ambiguous Roots," Feb. 1988, Digital Equip. Corp.'s Western Research Lab.

Wilson, et al., "A 'Card-Marking' Scheme for Controlling . . . ," unpublished working paper of EE and CS Dept. of Univ. Illinois.

Wilson, Paul, "A Simple Bucket-Brigade Advance. Mechanism . . . ," unpublished working paper of EE and CS Dept. of Univ. Illinois.

METHOD AND SYSTEM FOR RECLAIMING UNREFERENCED COMPUTER MEMORY SPACE

This is a continuation Ser. No. 07/989,741, filed Dec. 10, 1992, now abandoned, which is a continuation of Ser. No. 07/442,374, filed Nov. 28, 1989, now abandoned.

BACKGROUND OF THE INVENTION

This invention relates generally to computer memory management and more particularly to tracing-type garbage collection.

Garbage collection is the process of automatically reclaiming usable memory spaces in a computer memory by locating objects (blocks of memory) that are no longer needed, independently of the programs which request the allocation of such memory spaces. It is not always advisable to permit user programs to de-allocate the space allocated for the objects they create. This is because other programs may contain references to these objects, and premature deallocation would cause an error.

Garbage collectors must verify that there are no references (pointers) to an object, i.e., that the object is inaccessible, before deallocating the object's memory space. There are two general approaches to garbage collection: reference counting and tracing. Reference counting garbage collectors maintain a count of how many references there are to each object. If the reference count is zero, the block of memory can be deallocated (reclaimed). Reference-counting garbage collectors are efficient to execute but they have several limitations. They fail to recognize inaccessible "cyclic structures", which directly or indirectly reference themselves. Further, the maintenance of reference counts uses up space and can noticeably slow the performance of the user program.

Tracing garbage collectors periodically trace pointers, starting with a root set of objects. All objects pointed to by the root set are identified as reachable. Reachable objects are either marked or copied to another location. All objects pointed to by reachable objects are also identified as reachable. The process continues until all memory objects reachable from the root set have been found. What remains as unmarked (or uncopied) is inaccessible, and thus garbage. These inaccessible storage areas are de-allocated, and returned to the pool of available storage.

Tracing garbage collectors can cause significant interruptions of program execution. One approach to limiting the length of interruption is to define a "threatened set" of objects subject to collection. This approach is referred to as "partially threatening." By limiting the threatened set, the amount of tracing can be reduced, improving performance. For example, in "generational" garbage collectors, only younger objects are threatened. However, it is still necessary to determine whether an object pointed to is in the threatened set, preferably without following each pointer. One solution is to store newer objects in a particular region of memory as they are created. The garbage collector then need only scan for pointers to address in this region. Such generational collectors copy the threatened but reachable objects into the "non-threatened" memory space reserved for older objects, leaving a free, threatened space for the next generation.

Although copying collectors have the advantage of compacting the use of memory space, the copying operation is time-consuming. Further, it is not possible to sub-divide the threatened set at the time of collection. Still further, copying collectors must have knowledge of which bits in an object are address pointers (as opposed to data or instructions), because they update the pointers when they move objects to the non-threatened region. Copying collectors are thus incompatible with "conservative" garbage collection. In conservative collectors, the collector does not have perfect knowledge about the location of pointers, but makes conservative assumptions about which patterns of bits might be pointers to allocated objects and treats the object "pointed to" as reachable.

SUMMARY OF THE INVENTION

The invention provides a non-reference-counting, tracing garbage collector which can be partially threatening but does not require the copying of objects. The invention can be used to combine conservative and generational garbage collection.

According to the invention, objects are partitioned into "safe" and "threatened" sets. The safe objects are further partitioned into "bystanders" and "rescuers". The threatened objects pointed to by rescuers are identified as reachable. All threatened objects pointed to from reachable objects are also identified as reachable. When all reachable threatened objects have been identified, all unreachable threatened objects are "collected", or freed.

Further according to the invention, objects have A-values and F-values. The A-values (which may represent the time of allocation of the object) are used to partition objects into "safe" and "threatened". A value G is specified as the generational partition. Objects having an A-value less than G are safe, and the other objects are threatened. The F-values are used to partition the safe objects into rescuers and bystanders. The F-value represents the maximum A-value of the objects pointed to by an object. A safe object is a rescuer only if its F-value is not less than G, indicating that the object may point to a threatened object.

Advantageously, the A-values and F-values limit the size of the rescuer set and the scope of the tracing. The A-values and F-values also allow the flexible definition of the generational partition G without the necessity of moving objects. This in turn allows a conservative approach to the identification of pointers.

In a preferred embodiment, the A-values and F-values are maintained only for pages of objects. If a safe page is written to between collections, it becomes part of the rescuer set and its F-value is updated during the trace phase of the collection. The F-values of reachable threatened pages are also updated during the trace phase to refer to objects actually encountered. The maintenance of the F-values is thus accomplished with minimum overhead.

DETAILED DESCRIPTION OF PREFERRED EMBODIMENT

The preferred embodiment of the invention is a trace and sweep, non-copying, generational garbage collection program, which makes conservative assumptions about which patterns of bits might be pointers. The program operates on a virtual memory (VM) system wherein memory is divided into pages. One or more objects can be stored on each page. An object is a block of memory allocated at a single time and containing 0, 1, or more pointers to other objects. The time of allocation of an object (0) is referred to as its A-value, A(0).

For collection, objects are partitioned into "safe" and "threatened" ones based on their A-values, without reference to their location in memory. For efficiency, the partitioning is done in a page-based way. For each page (p), an A-value A(p) is stored. A(p) is the minimum A(0) for objects on the page, representing the time of allocation of the oldest object on the page. The A-value for the page is set when the first object on a page is allocated. In the discussion that follows, references to A-values for an object will be understood to refer to the A-value of the page on which the object is stored. A-values for individual objects are not stored as such.

A single time G (the generational partition) partitions the objects. The threatened set is defined as objects on pages p with $A(p) \geq G$. Only objects on threatened pages can be collected. Objects on safe pages, where $A(p) < G$, are not collected. G can be set at the time the collector is run, to flexibly define the generational partition without moving objects. This feature is to be distinguished from prior art generational collectors, where the generational partitioning is predefined by the location of objects, and the threatened set cannot be subdivided.

For each page, an F-value F(p) is also stored. This value approximates the "points-to" relationship among objects; F(p) is greater than or equal to the maximum A-value of the objects pointed to by any object on the page. F(p) can be a conservative (high) estimate, as long as no object on the page points to any object with a higher A-value than F(p). Methods of maintaining F(p) will be described below.

It will be understood that F-values, like A-values, values, can be associated with each object, rather than each page, and that the invention could be implemented with either or both values being stored and maintained for each object, instead of page-based values. It will also be understood that it is possible to use A-values representing values other than time, as long as the A-values can be compared in a partial order with a "less than" (<) operator. If this condition is met, then the F-values can approximate the "points-to" relationship by indicating a range of values containing the A-value of any object 0' pointed to from object 0. In this embodiment, this property is defined as follows:

If object (0) points to object (0'), then $F(0) \geq A(0')$.

In other words, an, object (0) cannot point to an object (0') if F(0) is not greater than or equal to A(0'). The F-value, as thus defined, provides an efficient way to determine whether an object might point to another object having a particular A-value, i.e., a threatened object.

The F-value F(p) for a page is greater than or equal to the maximum F(0) for all objects on the page. The F-pages may be the same or different sizes from the A-pages. Similarly, the F-pages and A-pages are not necessarily the same as the virtual memory pages. Although the F-pages, A-pages, and virtual memory pages are equal in the embodiments described herein, the trade-offs in the selection of page sizes will be apparent to those of ordinary skill in the art informed by the present disclosure. For example, smaller A-pages require more space for storage of A-values but may result in more objects being collected.

To enable one of ordinary skill to make and use the invention, two embodiments will be described. The first embodiment will be described with reference to flow charts of FIGS. 1 through 4 to illustrate the basic concepts of the invention in a simple form. The second embodiment will be described in more detail with reference to FIGS. 5 through 10 and an implementation in source code.

In the first embodiment, the garbage collector uses the VM operating system "dirty bit" to determine whether a pointer may have been updated and consequently the F-value may have changed. The dirty bits correspond to each page and are set by the VM operating system whenever the page is written to. If the dirty bit is on, the garbage collector will reset the page's F-value during its operation to refer to objects actually encountered.

The garbage collector has a "trace" phase and a "sweep" phase. During the trace phase, all threatened objects reachable from safe objects are marked. During the sweep phase, all unmarked threatened objects are "collected" (freed).

Figure 1:
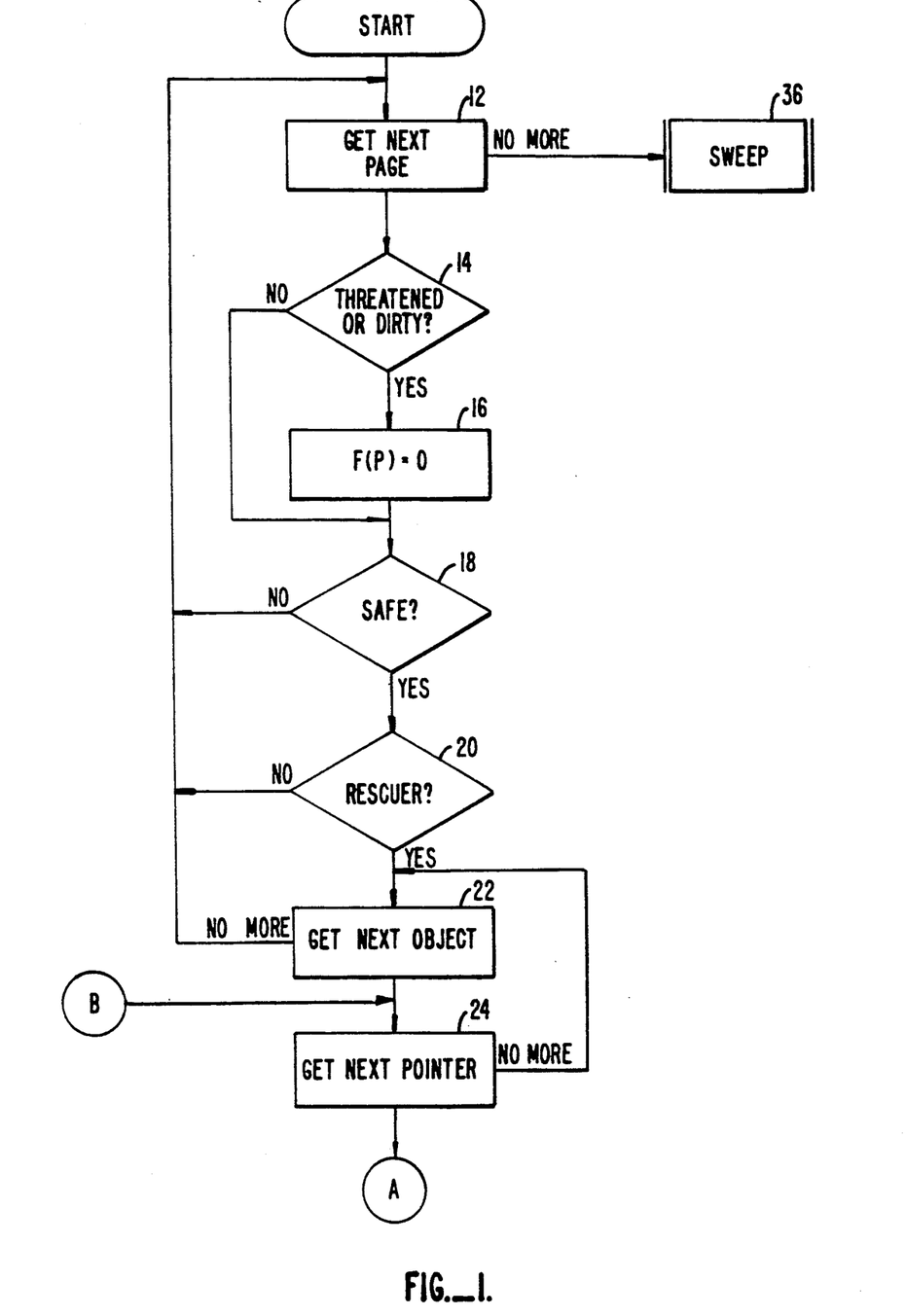
FIGS. 1-3 are flowcharts of the tracing phase of a trace and sweep garbage collector.

FIGS. 1-3 are flow charts of the trace phase of the garbage collection process of the first embodiment. Referring to FIG. 1 at block 12, the dirty bit and the F and A-values for a page are accessed. At block 14, the A-values and dirty bits are tested to determine whether the page is threatened ($A(p) \geq G$). If the page is threatened, or if the page has been written to (dirty bit on), then at block 16 the page's F-value is initialized to zero, in anticipation of resetting the F-value during the tracing phase.

At block 18, the page's A-value is tested to determine if the page is safe. At block 20, safe pages ($A(p) < G$), are partitioned into "rescuers" and "bystanders". Rescuers are safe pages that either have the dirty bit on or have an F-value indicating that the page may point to a threatened object ($F(p) \geq G$). In this manner, the F-value is used to limit the rescuer set without the necessity of following pointers to determine whether each safe object points to a threatened object.

Inclusion of safe dirty pages in the rescuer set increases the rescuer set, but it is necessary (because the true F-value is not known) and it ensures that the F-value for the page is updated. This update will limit the rescuer set for later collections. The F-value could be maintained more accurately between collections, for example by monitoring all assignments to pointers inside objects during execution of user programs. When a pointer is written, F(p) can then be set to either Max-(A(0'), F(p)), where 0' is the object pointed to, or to Max(A), defined to be the maximum A-value across all objects. Either of these approaches would improve the efficiency of the collector but would require execution of specially generated code (or special hardware) for all pointer assignments, as well as language-specific knowledge of pointers.

Figure 2:
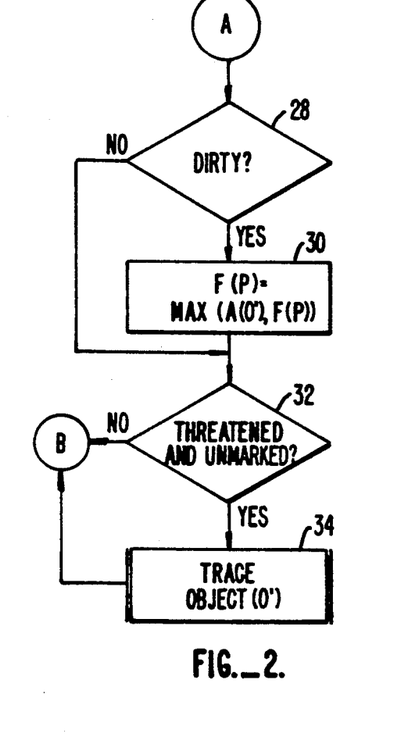

If the page is a "rescuer", then at block 22 an object (0) on the page is examined. At block 24, each potential pointer to another object (0') is read. Referring now to FIG. 2, at block 28, the dirty bit for the rescuing page is tested. If the dirty bit is on, then at block 30 the F-value is updated as follows. The A-value A(0') of the object pointed to is compared to the F-value F(p) for the rescuing page, and the F-value F(p) is set to the maximum of these two values. In this way, the F-value will ultimately be reset to the maximum A-value of objects pointed to from objects on the page, and it will then be accurate within the limits of the pointer identification technique.

At block 32, the object (0') pointed to from the object (0) on the rescuing page is tested to see if it (0') is in the threatened set (A(0')≧G) and if it is unmarked. For each unmarked threatened object pointed to, at block 34, the trace-object routine is called. On return, the object (0) is checked for more pointers. These steps at blocks 22-34 are repeated for all objects on the rescuing page. Then, when there are no more objects on the page, the next page is checked, until there are no more pages. Then the dirty bits are reset to false for all pages and at block 36 the sweep routine is called.

Figure 3:
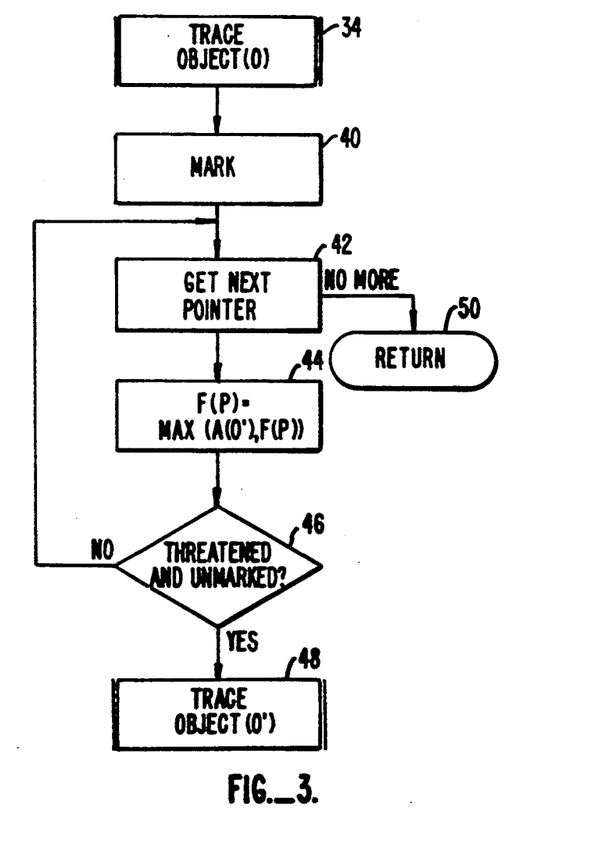

FIG. 3 is a flowchart of the trace-object routine 34 for tracing each unmarked threatened object (0) pointed to by a rescuer (or by any reachable object). At block 40 the object (0) is marked as reachable (not garbage). Then at block 42, each possible pointer from object (0) to another object (0') is read. At block 44, the F-value F(p) for the page p containing object (0) is updated. The current F-value is compared to A(0') and the higher value becomes the new F-value.

In this manner, the F-values for each reachable threatened page will be updated, whether or not the dirty bit is on. This is desirable because objects may be collected (freed) from a threatened page, and the pointers from the freed object will not affect the new F-value.

At block 46, the object pointed to (0') is tested to see if it is a threatened (A(0')≧G), unmarked object. For each threatened, unmarked object, at block 48 the trace-object routine is recursively called. When there are no more pointers in the object, at block 5, control returns to the calling routine.

Figure 4:
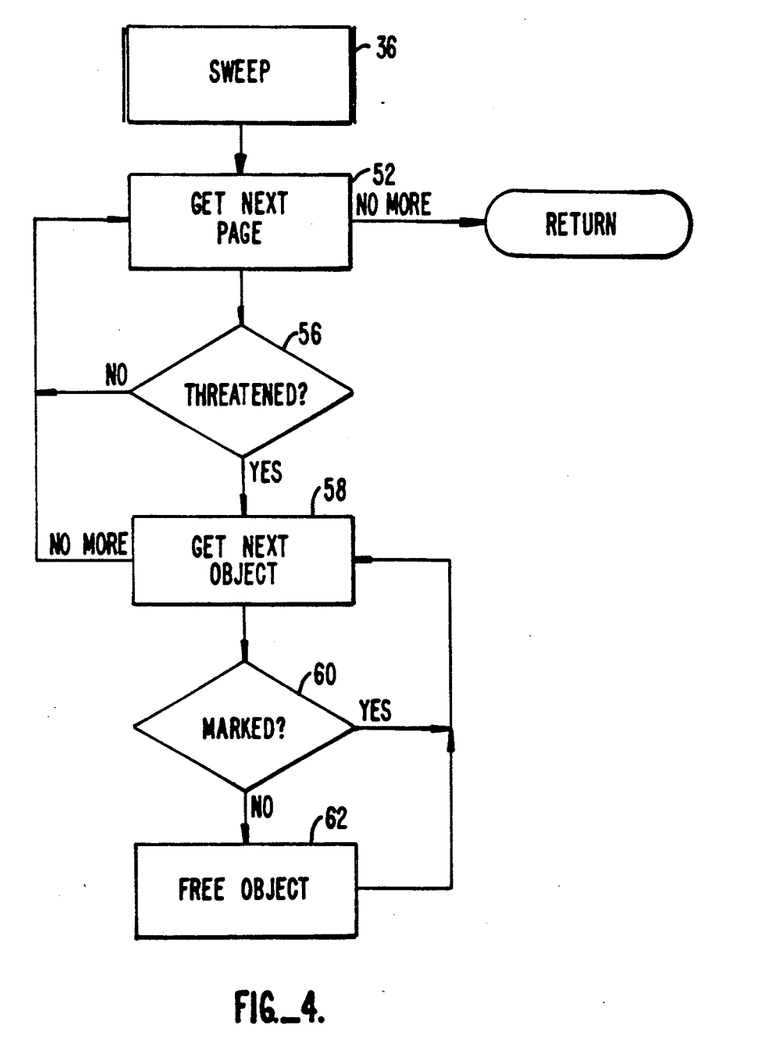
FIG. 4 is a flowchart of the sweep phase of a trace and sweep garbage collector.

FIG. 4 is a flowchart of the sweep routine 36. At blocks 52 an 56, each page is checked to see if it is threatened (A(p)≧G). For all threatened pages, at blocks 58, 60, and 62 the unmarked objects are collected. The remaining objects are then unmarked.

A second embodiment will now be described in more detail. In this embodiment, a different but substantially equivalent technique is used to maintain F-values. Each page is write-protected after a collection, and a current-time parameter is incremented. The first time a protected page is written to, F(p) is updated to the value of current-time as part of the page fault. When the collector is run, safe pages that have been written to will become rescuers (because G≦current time) and will have their F-value updated. As with the dirty bit technique, all reachable threatened pages will also have their F-value updated to refer to the maximum A-values of the objects actually encountered by the trace.

Other differences between the two embodiments described herein are illustrative of variations in programming strategy within the scope of the present invention.

Figure 5:
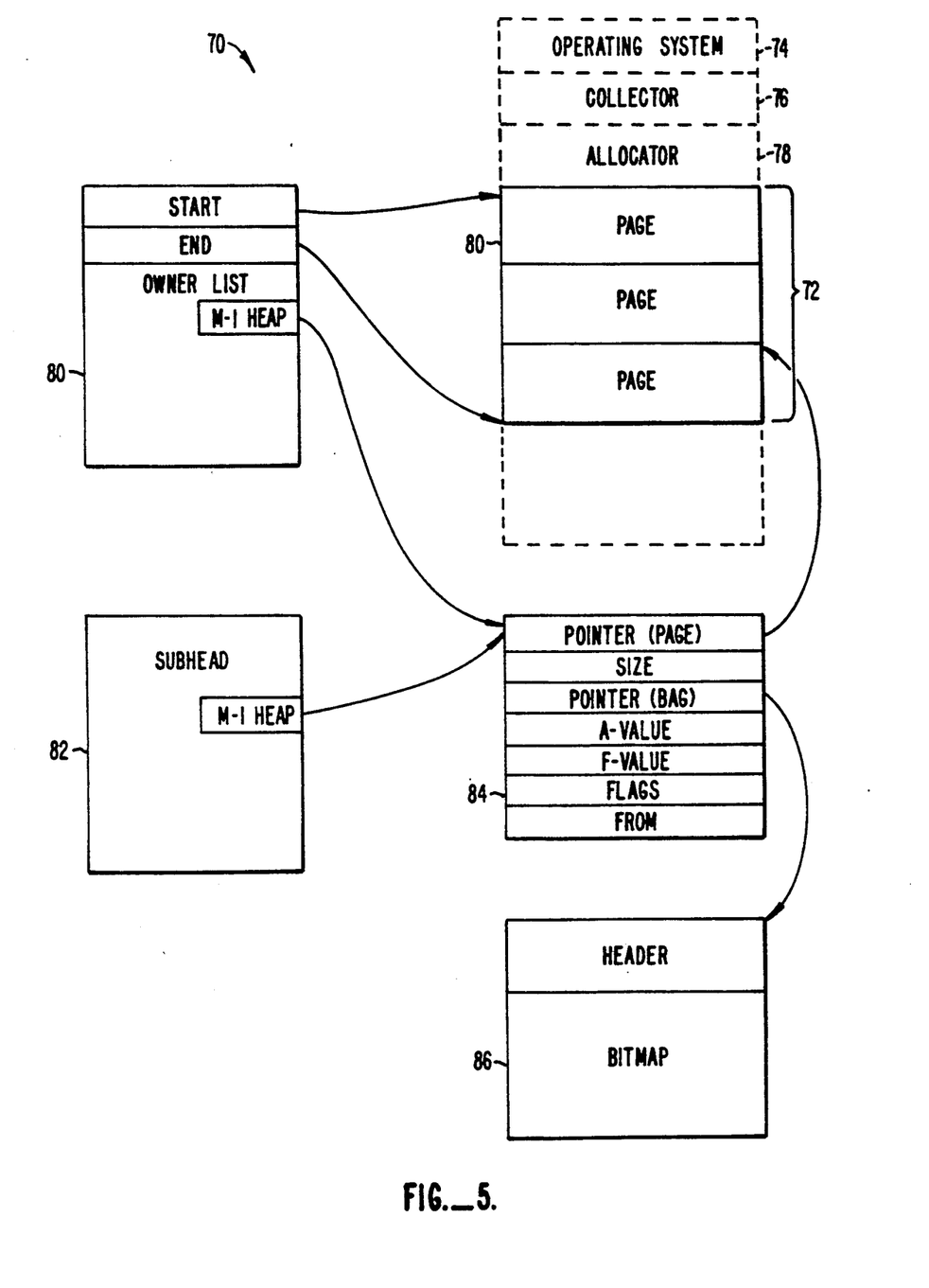
FIG. 5 is a block diagram of the layout of computer memory for a garbage collection system.

Referring to FIG. 5, a logical view of the organization of a computer memory 70 is shown. The memory comprises a user memory space 72, an operating system 74, a collector 76, an allocator 78, and collector data structures 80, 82, 84, 86.

User memory space 72 may be a virtual address space for user programs and data, with some of the stored data and programs actually stored on an external storage device, such as a magnetic disk drive. In this embodiment, user memory space 72 is divided into pages 88 of equal size for storing objects. The term "object" refers to a block of memory that can be allocated at a particular time for storing programs or data.

Virtual memory operating system program 74 controls the copying of pages to and from external storage (not shown) and the execution of stored programs on at least one CPU (not shown). Allocator 78 allocates available memory blocks for programs when requested by operating system 74. Collector program 76 is a garbage collector according to one embodiment of the present invention.

The key data structures used by garbage collector 76 and allocator 78 are global page heap 80, subheap 82, m-i-heap 84, and bag 86. Global page heap 80 stores pointers to the start and end of user memory space 72, and an owner list. The Owner list is an ordered list of pointers to a set of m-i-heap data structures, with a slot reserved in the owner list for each page in user memory space 72.

If there are any allocated objects on a page, then allocator 78 will have allocated and initialized an m-i-heap data structure for that page, and will have stored a pointer to this m-i-heap in the appropriate slot or slots in the owner list. Subheap 82 is a list of pointers to active m-i-heaps. An m-i-heap 84 stores a pointer to the start of the page, the size of objects on the page, a pointer to a bag data structure for this page, and the page's A-value and F-value. Bag 86 stores a bitmap of state values for the objects on the page, described below with reference to FIG. 6. A header area in bag 86 stores the total number of objects on the page and the total number of objects in each of the four possible states.

Figure 6:
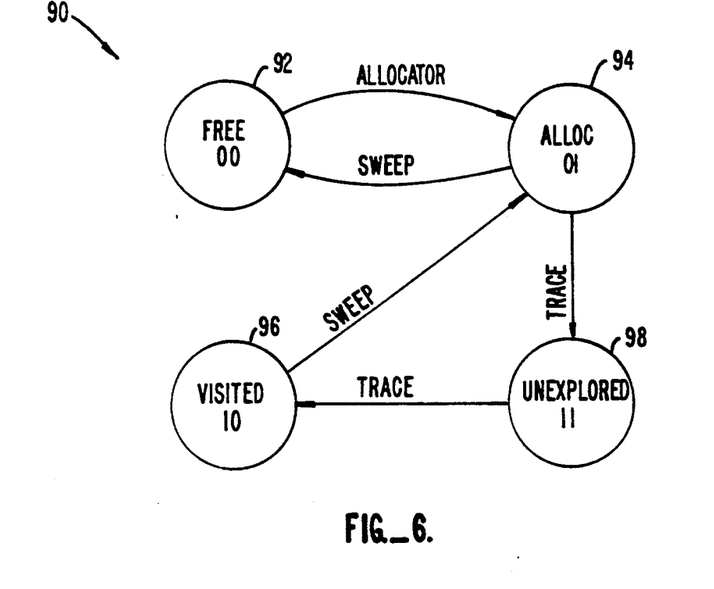
FIG. 6 is a state diagram of the possible states and transitions for objects in a garbage collection system.

FIG. 6 is a state diagram 90 showing the four states which an object can be in, and the state transitions. An object can be in one of these states: free 92, allocated 94, visited 96 or unexplored 98. The state information requires two bits per object. The bits for objects on a page are stored together in the bitmap as sets of words. When the garbage collector is not running, all objects are marked as "not visited" (leftmost bit=0) and are either allocated (01) or free (00). Objects can transition from free to allocated (rightmost bit→1) by the action of the allocator during execution of user programs. During the trace phase of the garbage collection, objects may transition from the allocated state to the unexplored (queued) state (leftmost bit→1), and then when they are explored from the unexplored state to the visited state (rightmost bit→0). During the sweep phase, the visit (leftmost) bit is read to see if the object has been visited, and the object gets a new state. Those objects which have been visited become allocated. Objects which are allocated but not visited during the trace become free. An efficient programming technique for implementing the sweep is described below with reference to FIG. 10.

The above-described variables and pointers are sufficient for an understanding of the following description of the garbage collector program of this embodiment. It will be understood that there are other variables and pointers, and other data structures, not shown or described, for use by the allocator 78. Allocator 78 will not be described in detail. A variety of allocator programs could be constructed by those of ordinary skill in the art to work with the data structures used by the garbage collector of this embodiment. The only significant constraint imposed by this embodiment is that each page stores objects of a particular fixed size.

It will be further understood that, although the garbage collector described below is executed on request and interrupts the execution of user program, it can be adapted to run in parallel or concurrently with the execution of user programs, preferably as an independent process. For example, a copy of some or all of the pages may be made and the address of the original page stored in the m-i-heap. The copy is used to determine what can be collected. The copy-on-write feature of the virtual operating system can be used to reduce the overhead of copying all of the data. Copy-on-write is a method of making virtual copies of large segments of a memory. Many programs share virtual copies, and the operating system only makes actual private copies of data which is written to by a program. Advantageously, the garbage collector does not modify the user data itself.

The structure and operation of the garbage collection computer program of this embodiment will now be described. The program is written in the "C" language for workstation UNIX operating systems. The source code is supplied as Appendix A.

Figure 7:
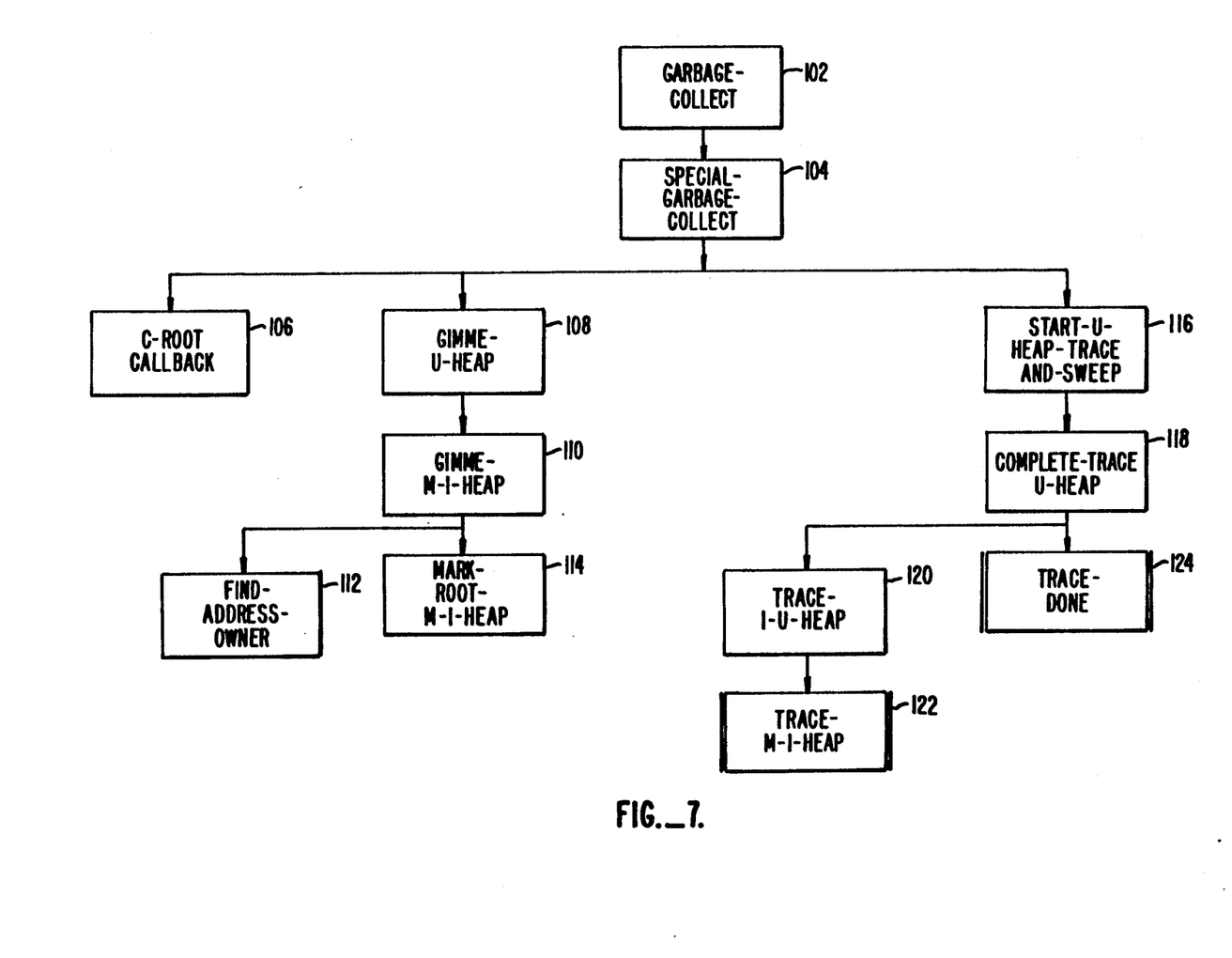
FIGS. 7-8 are block diagrams of a computer program for garbage collection.
Figure 8:
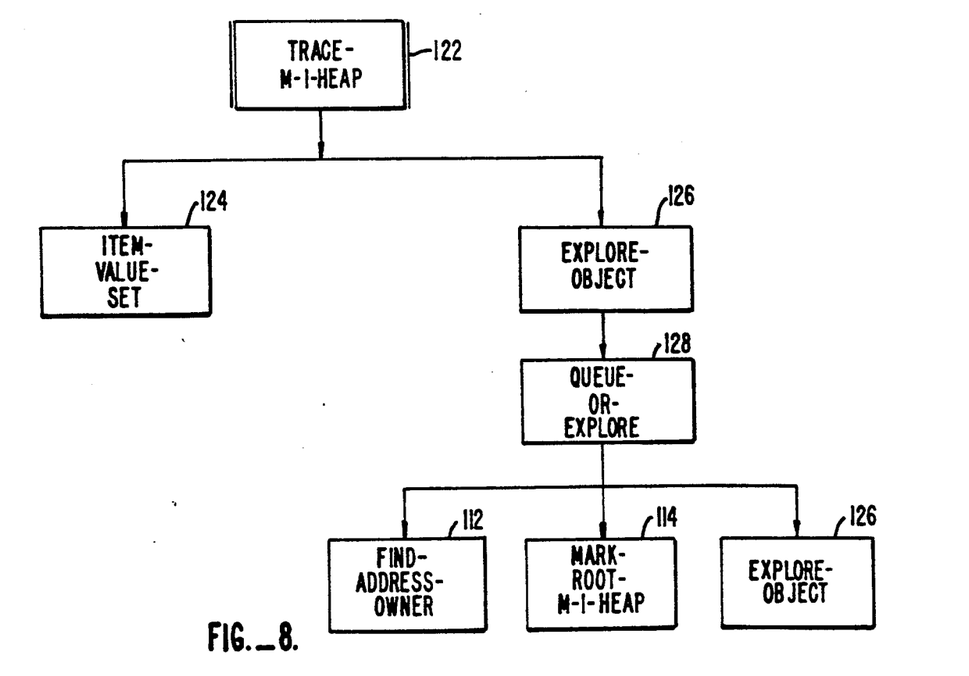
Figure 10:
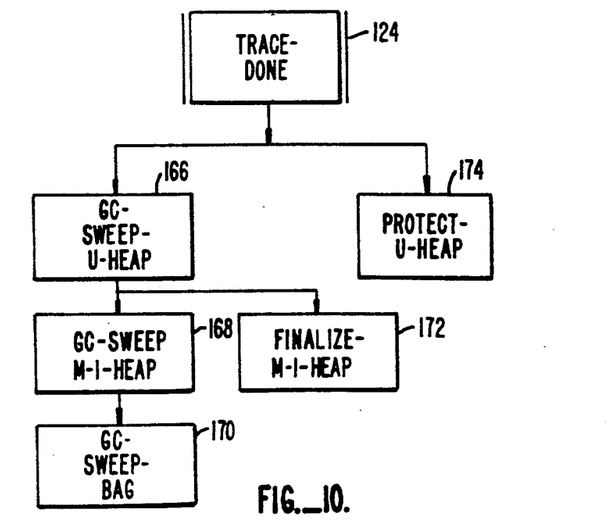
FIG. 10 is a block diagram of the computer program for the sweep phase of the garbage collection system.

FIGS. 7 through 10 illustrate the structure of the computer program of the preferred embodiment for a single garbage collection. In FIGS. 7, 8, and 10, each block represents a "C" function, or subroutine. A function is called (invoked) by the function above it in the drawing if a line connects the functions. Calls proceed generally from left to right after a return from all called functions in a line.

Referring to FIG. 7, the function garbage-collect 102 sets the generation gap variable and calls the function special-garbage-collect 104. Special-garbage-collect 104 calls C-root-callback 106 to mark all root objects pointed to from globals, stacks, and registers as unexplored. Then special-garbage-collect 104 calls function gimme-u-heap 108, which, for each "rescuing" page ($A(p) < G$ and $F(p) \geq G$), calls gimme-m-i-heap 110 to search the rescuing page for pointers to the threatened pages. Gimme-m-i-heap 110 initializes the F-value for the rescuing page to zero, then uses each pointer on the rescuing page to mark each referenced threatened object as "unexplored" and to update the F-value. The test for pointers will be described below with reference to FIG. 9.

Gimme-m-i-heap 110 calls function find-address-owner 112, which function returns the "owner" of the object pointed to by each pointer. The "owner" is the m-i-heap for the page on which the object pointed to is stored. The find-address-owner function takes an address as an argument, gets the start address of the user space from the global page heap, and then subtracts the start address from the argument address to obtain an offset. The offset is divided by the page size and the result is truncated to get an index into the owner list. The owner list, at this index, points to the m-i-heap (owner) for the argument address. The address of this m-i-heap is returned to gimme-m-i-heap.

The owner m-i-heap contains the A-value for the page (and thus for the object) pointed to. If the A-value is greater than the F-value for the rescuing page, the F-value is updated to the higher value.

Function mark-root-m-i-heap 114 is called by gimme-m-i-heap 110 to mark each threatened object pointed to by the rescuer as "unexplored" in the bitmap. The object is threatened if its page's A-value is greater than G, indicating that all objects on the page are younger than the generation gap.

After all rescuing pages have been searched for pointers, function start-u-heap-trace-and-sweep 116 is called by special-garbage-collect 104 to start the trace. Complete-trace-u-heap 118 calls trace-1-u-heap to loop 120 through the subheap until there are no unexplored objects. If there are unexplored objects in an m-i-heap, then trace-m-i-heap 122 is called.

Referring to FIG. 8, for each unexplored object trace-m-i-heap 122 calls item-value-set 124 to mark the object as "visited" and then calls explore-object 126. Explore-object 126 looks for pointers in the unexplored object. If the object pointed to is neither "free" nor "visited" the function queue-or-explore-object 128 is called for the object pointed to. The function queue-or-explore object 128 calls find-address-owner 112 to get the owner m-i-heap for the object pointed to. If the object is on the current page (and it is not yet visited), then explore-object 124 is called recursively.

If the object pointed to is not on the current page, then mark-root-m-i-heap 114 is called. If the object pointed to is on a threatened page, this function marks the object as unexplored. By queuing objects pointed to on other pages, the potential depth of recursion is limited, and the possibility of page faults is also limited.

Regardless of whether the object pointed to is queued or explored, the F-value for the current page is updated. If the A-value of the page pointed to is greater than the current F-value, then the current F-value is reset to the higher value.

Figure 9:
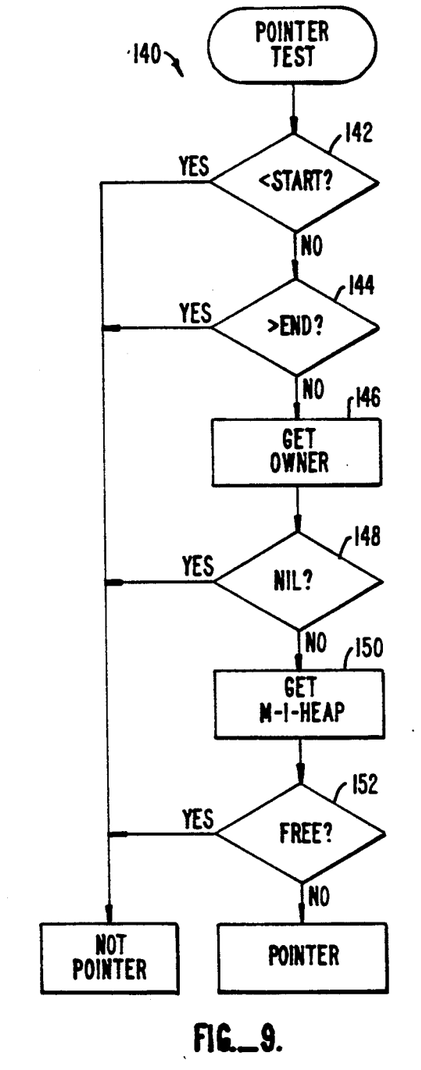
FIG. 9 is a flowchart of the test for pointers.

FIG. 9 is a flow chart 140 of one method for determining whether a word represents a possible pointer. The tests are arranged in order to eliminate non-pointer values as quickly as possible. At step 142 the word is eliminated if the value of the word is less than the starting address of user memory space (stored in the global page heap). At step 144, the word is eliminated if its value is greater than the ending address of the user memory space (also stored in the global page heap). At step 140, the owner of the "pointer" is determined from the global page heap owner list. If step 148 indicates that the owner list has a nil value for the owner at this address, than the page is not in use and the value is not a pointer. If there is a non-nil address for the owner, then, at step 150, the m-i-heap that owns the page with this address is accessed. The m-i-heap points to the bag, where the bit map indicates the state of the object at the pointed-to address. If step 152 indicates that the object is free, then this value cannot be a pointer.

If the value has passed all of these tests, then it is treated as a pointer. It may in fact not be a pointer, but these tests eliminate a reasonable number of non-pointers at minimal expense for a conservative, non-copying collector. Other tests (some of which may be language-specific) can be added where a higher collection rate is deemed worth the additional computational expense. For example, the value can be tested for word alignment. If the low-order bits are non-zero, the value is not a pointer. This is an inexpensive test performed after step 144. Another test is whether the value points to the start of an object, which can be determined by subtracting the value of the page start address and dividing the result by the object size. This is a relatively expensive test, preferably performed last.

Referring to FIG. 10, at the completion of the trace phase, when there are no more unexplored objects, the function trace-done 124 is called. Trace-done 124 calls gc-sweep-u-heap 166 to perform the sweep. For each m-i-heap in the subheap, gc-sweep-m-i-heap 168 is called. This function, calls gc-sweep-bag 170 to update the bit map.

After the trace is complete, all objects are in one of the three states of free, allocated or visited. The sweep phase converts visited objects to allocated, and allocated objects to free. Free objects remain free. Unthreatened (safe) pages are not "swept". The sweep phase operates on each bitmap for a threatened page, one word at a time. First the word is "anded" with a word of 1010101010101010 1010101010101010 to clear (set to free) the low order (free/allocated) bit for each object. Then the word is shifted right one bit, making all visited items allocated without changing the free items.

After the bit map is updated, the totals for each state are updated. If the totals are zero except for the free total, then finalize-m-i-heap 172 is called to free the bag and the page. The entries for this page in the subheap and in the global page heap owner list become nil, and the m-i-heap is freed. The subheap is then compacted to remove the nils. Protect-u-heap 174 is called to write-protect the pages to cause a fault the next time the page is written to.

The invention has now been described and illustrated with reference to particular embodiments. It will, however, be understood by those skilled in the art that modifications and additions may be made without departing from the true scope of the invention. For example, pointers could be located using programming-specific information. For another example, the non-copying collector described in this embodiment could be combined with a copying collector to make a partially copying collector using well-known methods. The foregoing description is not intended to limit the scope of the invention, which is defined by the following claims.

What is claimed is:

1. In a computer comprising a processor and a memory coupled to the processor, a method for reclaiming unreferenced memory space, the method performed utilizing a partition value G and comprising the steps of:

using the processor to allocate a plurality of objects, each object being allocated by the processor at a time of allocation, each object being stored in said memory and occupying space in said memory, at least some of said objects containing one or more pointers pointing to other objects, there being a pair of objects of the plurality such that the first object of said pair of objects ($0_1$) does not point to the second object of said pair of objects ($0_2$) and the second object of said pair of objects ($0_2$) does not point to the first object of said pair of objects ($0_1$);

using the processor to determine and to store in said memory a plurality of A-values;

using the processor to associate each A-value with at least one of the objects such that each object 0 has one associated A-value A(0) for representing a partial ordering of objects and in particular such that an A-value $A(0_1)$ is associated with the first object of said pair of objects ($0_1$);

using the processor to determine and to store in said memory a plurality of F-values;

using the processor to associate each F-value with at least one of the objects such that each object 0 has one associated F-value F(0), said associated F-value F(0) being greater than or equal to A-value A(0') in the partial ordering if object 0 points to object 0', and in particular such that an F-value $F(0_1)$ is associated with the first object of said pair of objects ($0_1$);

using the processor to compare the partition value G to the A-value $A(0_1)$ associated with the first object of the pair of objects ($0_1$) and to compare the partition value G to the F-value $F(0_1)$ associated with the first object of the two objects to determine that a condition is true, the condition being selected from the group consisting of the partition value G is not greater than or equal to $A(0_1)$ in the partial ordering and $A(0_1)$ is not greater than or equal to the partition value G in the partial ordering, and the partition value G is not greater than or equal to $F(0_1)$ in the partial ordering and $F(0_1)$ is not greater than or equal to the partition value G in the partial ordering;

using the processor to compare the partition value G to the A-value A(0) associated with the objects and to compare the partition value G to the F-value F(0) associated with the objects to identify rescuer objects, an object 0 being a rescuer object if the partition value G is greater than or equal to A(0) in the partial ordering and F(0) is greater than of equal to the partition value G in the partial ordering;

using the processor to examine each rescuer object to identify pointers to one or more threatened objects, said threatened objects being objects that have associated A-values greater than or equal to the partition value G in the partial ordering;

using the processor to trace the identified pointers to identify reachable objects, said reachable objects being threatened objects that are pointed to from the rescuer objects and threatened objects that are pointed to from reachable objects;

using the processor to store in said memory an indication that the identified reachable objects should not be deallocated; and using the processor to deallocate, and reclaim the memory space occupied by, all threatened objects for which there is no stored indication that the threatened object should not be deallocated.

2. The method of claim 1 wherein the step of using the processor to associate each A-value with at least one of the objects comprises using the processor to associated with each object an A-value less than or equal to the time of allocation of the object.

3. The method of claim 1 wherein the step of using the processor to associate each F-value with at least one of the objects comprises the step of using the processor to maintain each F-value so that each object 0 has an F-value F(0) greater than or equal to the A-value A(0') in the partial ordering if object 0 points to object 0'.

4. The method of claim 3 wherein the step of using the processor to maintain the F-value comprises using the processor to update the F-value associated with an object in response to a change to the object.

5. In a computer system having a processor and a memory coupled to the processor, a method of searching for reference objects in a defined set of target objects, the method comprising the steps of:

using the processor to allocate a plurality of objects, each object being stored in said memory, at least some of said objects pointing to other objects, there being a pair of objects of the plurality such that the first object of said pair of objects ($0_1$) does not point to the second object of said pair of objects ($0_2$) and the second object of said pair of objects ($0_2$) does not point to the first object of said pair of objects ($0_1$);

using the processor to store in said memory a plurality of A-values and associating each A-value with at least one object stored in the memory such that each object $0$ has an associated A-value $A(0)$ for representing a partial ordering of objects and in particular such that an A-value $A(0_1)$ is associated with the first object of said pair of objects ($0_1$);

using the processor to store in said memory a plurality of F-values and associating each F-value with at least one object stored in the memory such that each object $0$ has an associated F-value $F(0)$, said associated F-value $F(0)$ being greater than or equal to $A(0')$ in the partial ordering if object $0$ points to object $0'$, and in particular such that an F-value $F(0_1)$ is associated with the first object of said pair of objects ($0_1$);

using the processor to define a set of objects of the plurality to be the set of target objects, the first object of the pair of objects not being in the set of target objects, the second object of the pair of objects being in the set of target objects;

using the processor to store a value G, said value G being less than or equal to the A-values of the target objects with respect to the partial ordering;

using the processor to compare the F-value $F(0)$ of an object $0$ to the value G to determine whether $F(0)$ is greater than or equal to G in the partial ordering; and if the F-value $F(0)$ is greater than or equal to G in the partial ordering, then using the processor to search object $0$ for pointers to the target objects and to trace each pointer thus found to its corresponding target object.

* * * * *